Oct. 7, 1947.  A. V. LOUGHREN  2,428,427
POSITION-INDICATING DEVICE
Filed Sept. 15, 1944  2 Sheets-Sheet 1

FIG. 1

INVENTOR
ARTHUR V. LOUGHREN
BY
ATTORNEY

Patented Oct. 7, 1947

2,428,427

UNITED STATES PATENT OFFICE 2,428,427

POSITION-INDICATING DEVICE

Arthur V. Loughren, Great Neck, N. Y., assignor by mesne assignments, to Hazeltine Research, Inc., Chicago, Ill., a corporation of Illinois Application September 15, 1944, Serial No. 554,197

19 Claims. (Cl. 250—1.62)

The present invention relates to position-indicating devices of the type adapted for use as an aid in the navigation of a mobile craft and particularly to such devices of the radiant-energy type employed in position-indicating systems which utilize a plurality of spaced antenna systems.

It is frequently desirable that the position of a mobile craft, such as an aircraft or marine vessel, be readily ascertained and that the movement of such craft be continuously indicated. In prior indicating devices for this purpose, compass indications together with indications of direction with respect to two or more known fixed points of transmission or reception are required. These indications are then plotted to determine, by the method of triangulation, the position of the craft with which the indicating device is associated. Three such fixed stations are required where compass bearings are not available or cannot be relied upon. This has the disadvantage, of course, not only that a plurality of fixed known stations be available with which bearings may be taken, but also that the procedure by which position is ascertained is necessarily cumbersome and requires materially more time than is frequently available or desirable. There is the additional disadvantage with this type of prior system that position indications thus obtained from radio bearings are inherently less accurate than those obtained by radiant-energy measurements of distance of the craft from the plurality of fixed stations of known position.

It would be desirable that the position of a mobile craft be directly indicated in the nature of a plan view on a position-indicating device, in this manner avoiding the laborious and slow plotting steps heretofore necessarily performed in ascertaining position. The indications provided by a plan view permit the movement of a mobile craft continuously and accurately to be indicated.

It is an object of the present invention, therefore, to provide a new and improved position-indicating device which avoids one or more of the disadvantages and limitations of prior devices of this type.

It is a further object of the invention to provide a new and improved indicating device for indicating the position of a mobile craft wherein the indications provided by the device are in the nature of a plan view with respect to a fixed known reference point.

It is an additional object of the invention to provide a new and improved device for indicating the position of a mobile craft in which both the direction and distance of the craft from a fixed known reference point are simultaneously and visually indicated.

In accordance with the invention, there is provided in a radiant-energy system of the type which effects the transmission of modulation signals to an antenna of one antenna system from individual ones of at least two spaced antennas of another antenna system and over at least two space paths extending between the antennas of the one and the other antenna systems, a position-indicating device at the one antenna system for indicating the position of the one antenna system relative to the other antenna system. This device comprises means responsive to modulation signals transmitted from the aforesaid other antenna system to the aforesaid one antenna system over the aforesaid space paths for developing therein a control effect varying with the direction of the one antenna system relative to the other antenna system. The device includes means responsive to the transmission of modulation signals from the aforesaid other antenna system to the aforesaid one antenna system over one of the space paths for developing therein a control effect varying with the distance between the antenna systems. The device additionally includes means responsive to the joint operation of the first-mentioned and second-mentioned means for providing in two coordinate directions an indication in plan view of the position of the aforesaid one antenna system relative to the aforesaid other antenna system.

In accordance with one form of the invention, there is provided in a radiant-energy system of the type which effects translation of a modulation signal over at least two space paths extending between an antenna of one antenna system and individual spaced antennas of another antenna system, a position-indicating device for indicting the position of one of said antenna systems relative to the other. This device comprises means responsive to modulation signals translated over the aforementioned space paths for indicating the direction of one of the antenna systems relative to the other, means responsive to modulation signals received from the said other antenna system for providing a control effect having a characteristic which varies with the distance of the one antenna system from the other antenna system, and means responsive to this characteristic of the control effect for controlling the first-mentioned means to cause the indications additionally to be indicative of the said distance, thereby to indicate the position of the one antenna system relative to the other antenna system.

In accordance with a particular form of the invention, there is provided in a position-indicating system of the type including at least one transmitter and at least two spaced antennas for transmitting individual ones of a plurality of wave signals, a position-indicating device for receiving these signals to indicate its position with respect to these antennas. This device comprises means responsive to signals received from the antennas for indicating the direction of the position-indicating device relative to the antennas. The indicating device includes means responsive to signals received from one of the antennas for providing a control effect having a characteristic which varies with the distance of the indicating device from the one antenna, and means responsive to the characteristic of this control effect for controlling the first-mentioned means to cause the indications thereof additionally to be indicative of the said distance, thereby to indicate the position of the indicating device relative to the antennas.

In accordance with a particular feature of the invention, the position-indicating system is of the type including a plurality of stations each comprising at least one transmitter and two spaced antennas for transmitting a plurality of wave signals characteristic of the station. The position-indicating device includes means for selecting the wave signals which are characteristic of a selected one of the stations to provide in a predetermined indicating area the aforementioned direction and distance indications. The device further includes a map scaled to the distance indications and adapted to be so positioned and oriented with relation to the indicating area that the indications indicate the geographic position of the indicating device relative to the antennas of the selected station, and means for causing the selecting means to select the wave signals of the selected station and for simultaneously moving the map into oriented position with relation to the indicating area.

For a better understanding of the present invention, together with other and further objects thereof, reference is had to the following description taken in connection with the accompanying drawings, and its scope will be pointed out in the appended claims.

Referring now to the drawings.

Figure 1:
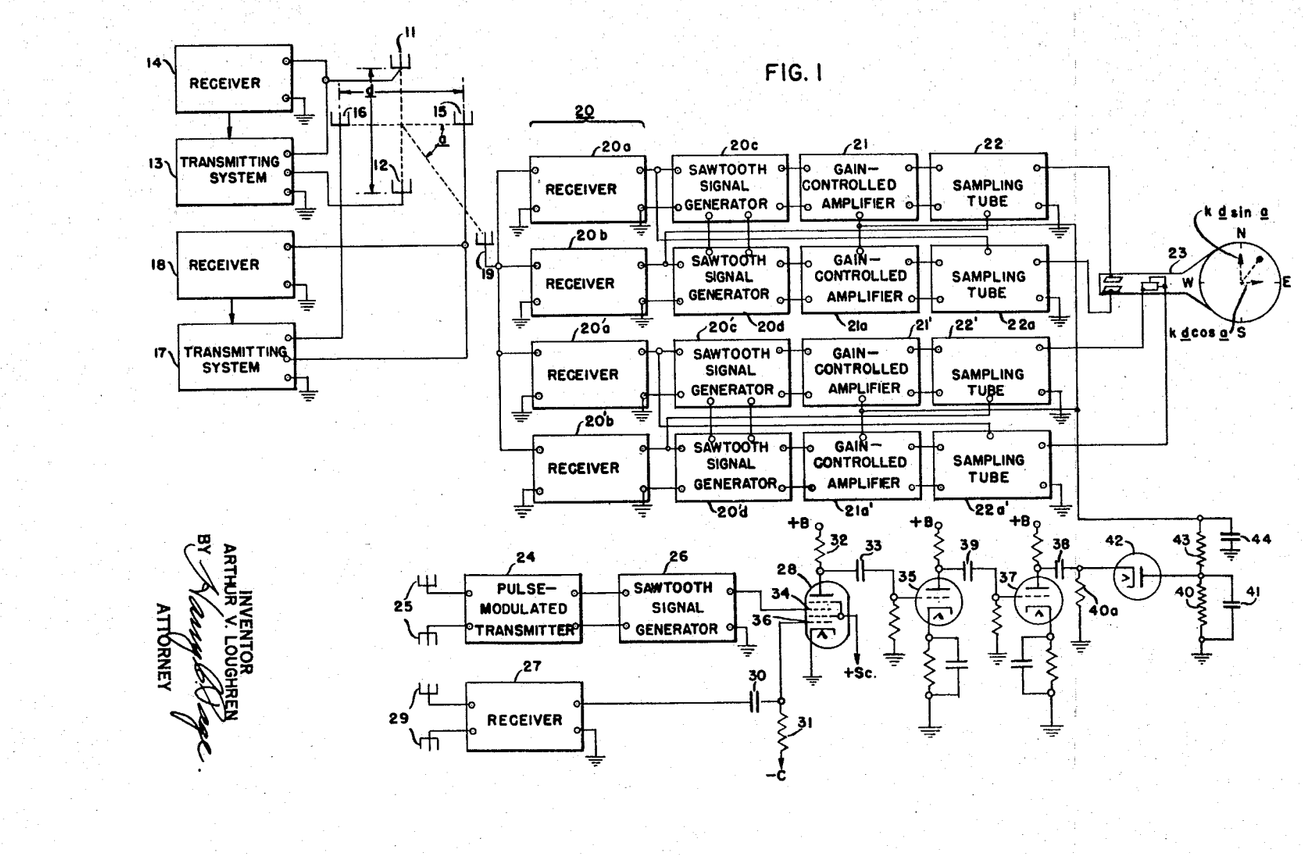
Fig. 1 is a circuit diagram, partly schematic, of a complete position-indicating system embodying the present invention in a particular form.

Referring now more particularly to Fig. 1, there is represented a circuit diagram, partly schematic, of a complete position-indicating system embodying the present invention in a particular form. It includes a direction indicating system of the type disclosed in the United States Patent No. 2,406,468, granted on August 27, 1946, to Bernard D. Loughlin, entitled Direction indicating system, and assigned to the same assignee as the present invention. Reference is made to this copending application for a detailed description of the direction indicating system. Considered briefly, however, the last-mentioned system includes a pair of spaced antennas 11, 12 coupled to the output circuits of individual ones of a pair of transmitters included in a transmitting system, indicated as a unit 13, for generating and transmitting individual ones of a pair of wave signals of individual carrier frequencies and amplitude-modulated by a signal of periodic-pulse wave form. The operation of unit 13 is initiated by the output signal of a receiver 14 which has an input circuit coupled to antenna 11. The receiver 14 and transmitting system 13 essentially comprise a transpondor system for transmitting reply signals in answer to a received control or interrogating signal. The system also includes a second pair of spaced antenna systems 15, 16, coupled to the output circuits of individual ones of a pair of transmitters included in a transmitting system 17. The wave signals generated by unit 17 have individual carrier frequencies, different from those of the wave signals generated by unit 13, and are amplitude-modulated by a signal of periodic-pulse wave form having the same periodicity as that of the modulating signal of unit 13.

Here again the operation of unit 17 is initiated by the output signal of a receiver 18 having an input circuit coupled to antenna 15. The receiver 18 and unit 17 constitute a second transpondor system. Antenna systems 11, 12, 15 and 16 are preferably located on the axes of a system of Cartesian coordinates and equidistant from the origin thereof. These elements of the system are normally terrestrially located. The portion of the system presently to be described comprises a position-indicating device which is normally associated with a mobile craft, the position of which is to be indicated.

The position-indicating device includes means for receiving signals from the antennas 11, 12, 15 and 16 and responsive thereto for indicating the direction of the position-indicating device relative to the antennas. This means, which is described in detail in the aforementioned copending application except for one change therein presently to be considered, briefly comprises a direction-signal developing system 20. The latter includes wave-signal receivers 20a and 20b, for selectively receiving wave signals radiated by the respective antennas 11 and 12 and for deriving the modulation components thereof, and wave-signal receivers 20a' and 20b' for selectively receiving wave signals radiated by the respective antennas 15 and 16 and for deriving the modulation components thereof. Coupled to individual ones of the output circuits of the receivers 20a, 20b, 20a' and 20b' are a plurality of saw-tooth generators 20c, 20d, 20c' and 20d', respectively. The two saw-tooth signal generators 20c and 20d, and likewise the two generators 20c' and 20d', are so intercoupled that the initiation of a cycle of operation by either is effective to de-energize the other during such cycle of operation. The input circuits of a plurality of gain-controlled amplifiers 21, 21a, 21' and 21a', provided in accordance with the present invention, are coupled to individual ones of the output circuits of the respective generators 20c, 20d, 20c' and 20d'. The input circuits of a plurality of sampling tubes 22, 22a, 22' and 22a' are coupled to individual ones of the output circuits of the respective amplifiers 21, 21a, 21' and 21a'. The output circuit of the receiver 20a is coupled to a second input circuit of the sampling tube 22a, while the output circuit of the receiver 20b is coupled to a second input circuit of the sampling tube 22. Similarly, the output circuit of the receiver 20a' is coupled to a second input circuit of the sampling tube 22a' and the output circuit of the receiver 20b' is coupled to a second input circuit of the sampling tube 22'. The output circuits of the sampling tubes 22 and 22a are coupled in balanced relation to the vertical deflecting electrodes of a cathode-ray tube 23 and the output circuits of the sampling tubes 22' and 22a' are coupled in balanced relation to the horizontal deflecting electrodes of the tube 23.

It is the purpose of the portion of the position-indicating device just described to develop from the received wave signals direction-indicative signals which are applied to the cathode-ray tube 23 to indicate the direction of the indicating device relative to the antennas 11, 12, 15 and 16.

The indicating device also includes means responsive to signals received from one of the transmitting antennas 11, 12, 15 or 16 for providing a control effect, specifically a control potential, having a characteristic which varies with the distance of the indicating device from this antenna. This means comprises a pulse-modulated wave-signal transmitter 24 having an output circuit coupled to an antenna system 25 and adapted to radiate therefrom an interrogating signal of the frequency to which the receivers 14 and 18 of the terrestrially located transpondor systems are tuned. The control-potential deriving means also includes means having an operation initiated by the interrogating signal of transmitter 24 and responsive to signals received from one of the terrestrially located antennas for providing the desired control potential.

This means, which will now be described in detail, comprises a linear saw-tooth signal generator 26, having an input circuit coupled to a modulation-signal generator included in the transmitter 24 for synchronized operation with the signal generator. Generator 26 has an output circuit coupled to a first control electrode 34 of a tube 28 for applying thereto a saw-tooth signal. A receiver 27 has an input circuit coupled to a suitable antenna system 29 and is adapted to receive wave signals from one of the terrestrially located antennas, for example the antenna 11, which, as previously mentioned, radiate pulse-modulated wave signals. The output circuit of receiver 27 is coupled through a condenser 30 to another control electrode 36 of tube 28. The control electrode 36 has applied thereto through a resistor 31 a biasing potential, provided by a source indicated as —C, sufficient to bias tube 28 to anode current cutoff. The screen electrode of tube 28 is provided with a proper operating potential by connection to a source indicated as +Sc. The anode of tube 28 is coupled through a resistor 32 to an appropriate source of space current, indicated as +B, and also is coupled through a condenser 33 to the control electrode of a vacuum-tube amplifier 35. The output circuit of the amplifier tube 35 is coupled through a condenser 39 to the input electrodes of a second vacuum-tube amplifier 37, the output circuit of which is in turn coupled through a condenser 38 to the cathode of a diode rectifier device 42 having a load impedance comprising a shunt resistor 40 and condenser 41. A resistor 40a completes the direct current path for the rectifier system.

The position-indicating device additionally includes means responsive to the characteristic of the gain-control effect, specifically to the amplitude of the gain-control potential, provided by the last-described means for controlling the direction-indicating means to cause its indications also to be indicative of the distance of the indicating device from the transmitter antenna systems 11, 12, 15 and 16. This means comprises a gain-control circuit included in each of the amplifiers 21, 21a, 21' and 21a' and responsive to the gain-control potential for varying the gains thereof. These control circuits are coupled through a filter network comprising a series resistor 43 and a condenser 44 to the output circuit of the rectifier device 42.

Figures 2, 3, 4, 5:
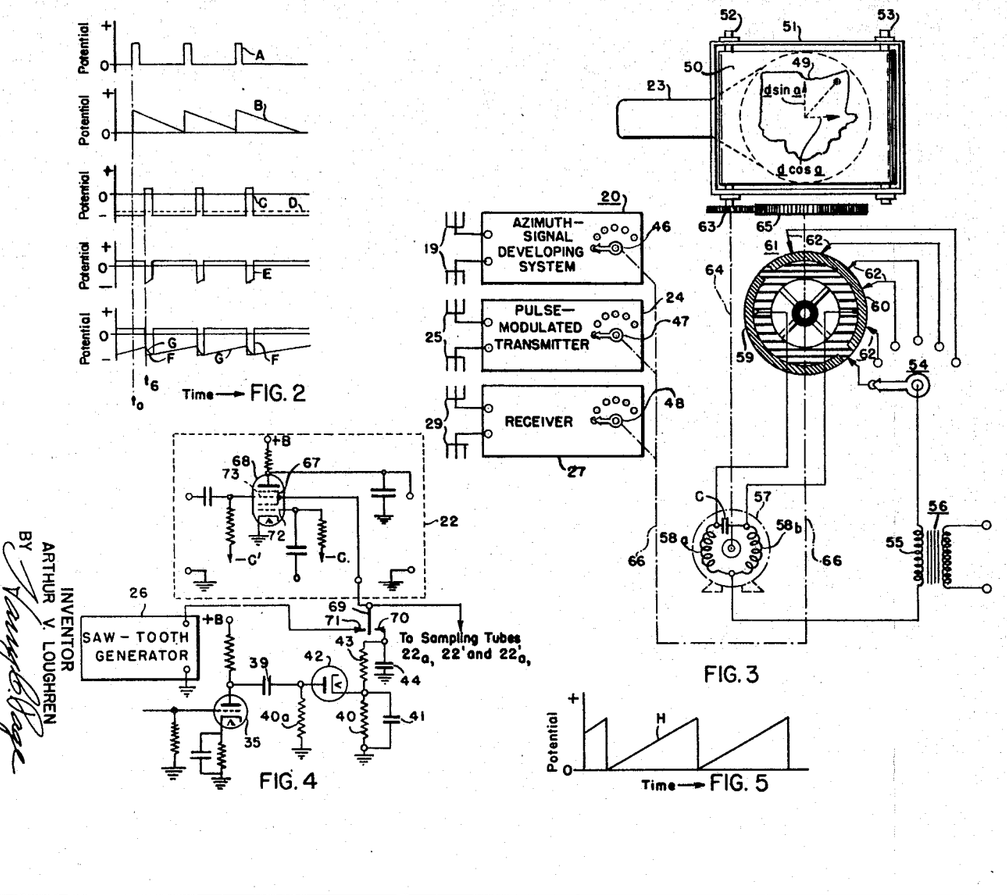
Fig. 2 illustrates graphically representative voltage variations occurring at selected points in the system of Fig. 1 and is employed as an aid in explaining the operation of the invention.
Fig. 3 represents a portion of an indicating device suitable for use in a system embodying a modified form of the invention.
Fig. 4 is a circuit diagram of a portion of an indicating device embodying the invention in a modified form.
Fig. 5 is a graph used in explaining the operation of the Fig. 4 modification.

Considering now the operation of the position-indicating system just described, and referring to the curves of Fig. 2, a signal of periodic-pulse wave form, represented by curve A, is generated by a generator of the transmitter 24 and used to amplitude-modulate a wave signal also generated by the latter. This modulated wave signal, which may be considered an interrogating signal, is radiated by the antenna 25 and received by the receivers 14 and 18 of the transpondor systems. These receivers derive the modulation components of the received wave signal and apply them as periodic-pulse control potentials to a control circuit of their associated transmitting systems 13 and 17. The latter units, the operation of which is explained in detail in the aforementioned copending application, apply to each of the antennas associated therewith periodic-pulse modulated wave signals having related frequencies and phase-related modulation components. Each pulse of these modulated wave signals corresponds to a pulse of the wave signal radiated from the transmitter 24 and received by the receivers 14 and 18 so that the former are effectively a reply to the latter.

Corresponding wave-signal pulses are simultaneously radiated by the pairs of antennas 11, 12 and 15, 16. Assume that the position of the indicating device relative to the antennas 11 and 12 is such that, of the corresponding wave-signal pulses radiated by the antennas 11 and 12, the first pulse to arrive at the indicating device is that from the antenna 11. This wave-signal pulse is received by the receiver 20a which derives the modulation components thereof and applies them to the saw-tooth signal generator 20c to initiate a cycle of operation of the latter. Generator 20c thereupon deenergizes generator 20d in order that only one saw-tooth signal shall be generated and this by the wave-signal pulse first to arrive at the receivers 20a and 20b. The saw-tooth signal generated by the generator 20c is applied through the gain-controlled amplifier 21 to an input circuit of the sampling tube 22, but is not repeated by the latter until there is applied to a second input circuit of this unit a potential pulse developed in the output circuit of the receiver 20b from the corresponding but later arriving wave-signal pulse radiated by the antenna 12. Since the wave signal of the interrogating transmitter 24 is modulated by a signal of periodic-pulse wave form, the wave signals radiated by the antennas 11 and 12 are also modulated by a signal of periodic-pulse wave form so that the operation of units 20a to 22, just described, is a periodic one. The output circuit of the sampling tube 22, however, includes a time-constant circuit having a time constant sufficiently long that the periodic-pulse wave developed in the output of tube 22 is integrated to derive therefrom a positive unidirectional potential or control signal. The latter has a magnitude varying with the relative times of reception of corresponding wave-signal pulses radiated by the antennas 11, 12 and thus varying with the direction of the indicating device relative to these antennas. In particular, it is explained in the aforementioned copending application that this control signal has an amplitude varying with the relation:

$$y = kd \sin a \quad (1)$$

where $k$ = an arbitrary constant,
$d$ = the space separation of the antennas 15 and 16 and of the antennas 11 and 12, and
$a$ = the angle which a line, drawn from the antenna 19 to the center of antenna system 11, 12, 15 and 16, makes with a line joining the antennas 15 and 16.

This control signal is applied to the vertical deflecting electrodes of cathode-ray tube 23 to deflect the beam thereof vertically upward.

If it had been assumed that the position of the indicating device relative to the antennas 11 and 12 were such that the wave-signal pulse radiated by the antenna 12 were the first to arrive at the indicating device, this received wave-signal pulse would have been translated by the receiver 20b to initiate a cycle of operation of the saw-tooth signal generator 20d, thereby deenergizing the saw-tooth signal generator 20c, and the generated saw-tooth signal would have been translated through the amplifier 21a to the sampling tube 22a where it would have been sampled by the signal developed in the output circuit of the receiver 20a upon the later arrival of the wave-signal pulse from the antenna 11. The control signal of positive polarity developed in the output circuit of the sampling tube 22a would then have produced a downward vertical deflection of the cathode-ray beam of tube 23, or one in an opposite direction to that described.

The operation of the signal-translating channels 20a' to 22' and 20b' to 22a' is similar to that described except that, of corresponding wave-signal pulses radiated by the antennas 15 and 16, the first pulse to arrive at the indicating device initiates a cycle of operation of one of the generators 20c' or 20d', thus to develop in the output circuit of a corresponding one of the sampling tubes 22' or 22a' a unidirectional potential or control signal which is effective to deflect the cathode-ray beam of tube 23 horizontally. The direction and magnitude of movement of the beam varies with the relative times of reception of a corresponding wave-signal pulse radiated by the antennas 15 and 16. It is explained in the aforementioned copending application that the amplitude of the control signal developed in the output circuit of the sampling tube 22' or 22a' varies in accordance with the relation:

$$x = kd \cos a \quad (2)$$

Thus, when these control signals are individually applied to the vertical and horizontal deflecting electrodes of the cathode-ray tube 23, the cathode-ray beam thereof is deflected to a position varying jointly with the amplitudes of the two control signals; that is, to a position varying with $kd \tan a$. The angular deflection of the cathode-ray beam consequently provides an indication of the direction of the indicating device relative to the transmitting antennas 11, 12, 15 and 16 and the generation of the control signals by the units of the indicating device described is such that the polarity of the control signals also varies in a manner to provide, through 360 degrees, direction indications without ambiguity.

Since the deflecting forces exerted on the cathode-ray beam of tube 23 are normal to each other, it will be apparent that the magnitude of the radial deflection of the beam is given by the relation:

$$r = \sqrt{k^2 d^2 (\sin^2 a + \cos^2 a)} \quad (3)$$

or $$r = kd \quad (4)$$

It is further explained in the aforementioned copending application that the magnitudes of the control signals developed in the output circuits of sampling tubes 22, 22a, 22', and 22a' are independent of the intensities of the received wave signals and vary only with the relative times of reception of the modulation components thereof. This assumes, of course, a given constant value of amplification of the saw-tooth signals in all signal-translating channels from the point where the signals are developed by the generators 20c, 20d, 20c' and 20d' to the sampling tubes 22, 22a, 22' and 22a'.

In accordance with the present invention, however, the amplification of the signal-translating channels is varied in accordance with the distance of the indicating device from the transmitting antennas 11, 12, 15 and 16 to vary the radial deflection of the cathode-ray beam of tube 23, thus to provide an indication of the distance of the indicating device from the last-mentioned antennas. The manner in which this is accomplished in the present indicating system will now be considered.

At the time $t_0$, Fig. 2, that a given pulse of the interrogating signal is radiated from the transmitter 24, the latter also applies a control pulse to saw-tooth signal generator 26. Generator 26 thereupon generates a corresponding cycle of a reference signal of linear saw-tooth wave form, as shown in curve B. Each cycle of the reference signal has a maximum initial value and a period at least as long as the time of wave-signal travel from the antenna 25 to the transmitting antenna 11 and back to the receiving antenna 29 when the device is positioned at its maximum desired operating range from the transmitting antennas. This reference signal is applied with positive polarity to the control electrode 34 of tube 28, but is not repeated in the output circuit of the latter due to the anode current cutoff bias impressed on the control electrode 36 thereof from source $-C$.

At time $t_5$, which neglecting a slight delay introduced by the apparatus of units 13 and 14 follows time $t_0$ by an interval as long as the total time of wave-signal travel between the antennas 25, 11 and 29, the pulse-modulated wave signal from antenna 11 arrives at antenna 29. The modulation components thereof are derived in receiver 27 and a corresponding one of the resultant pulses, represented by curve C, is applied with positive polarity to the control electrode 36 of tube 28 to overcome the effect of the bias $-C$, which is indicated in Fig. 2 by the broken-line curve D. That portion of the reference signal, applied to the control electrode 34 of tube 28, which occurs during the pulse applied to the control electrode 36 of the latter is thus repeated to the output circuit of tube 28 and applied to the control electrode of amplifier tube 35 as a control signal of periodic-pulse wave form, as indicated by curve E. Since the reference signal has a linear saw-tooth wave form, it follows that the amplitude of this control signal varies with the time interval $t_6-t_0$ and therefore with the distance between the transmitting antenna 11 and the position-indicating device. The greater the distance, the lesser the amplitude of the control signal, and vice versa.

The last-named control signal is applied from the output circuit of amplifier tube 35 to the input circuit of amplifier tube 37 and appears in the output circuit of the latter as an amplified signal of periodic-pulse wave form having pulses of negative polarity, as indicated in curve F.

This control signal is applied to the diode rectifier 42 which derives therefrom, and across the diode load impedance 41, 40, a control potential of negative polarity. The time constant of the resistor 40 and condenser 41 is preferably long with relation to the period of the control signal to effect peak rectification of the latter, as indicated by curve G. This control potential is applied through the filter network 43, 44 to the gain-control circuits of amplifiers 21, 21a, 21' and 21a' to control the over-all gain of the signal-translating channels provided between the units 20c, 20d, 20c' and 20d' and the respective units 22, 22a, 22' and 22a'.

Amplifiers 21, 21a, 21' and 21a' are normally so biased as to have high gain in the absence of a gain-control potential applied thereto so that the amplitudes of the control signals applied to tube 23 have maximum values when the indicating device is positioned at the maximum range of operation with relation to the transmitter antennas 11, 12, 15 and 16. Thus, at this maximum range the luminous spot developed on the screen of tube 23 appears at a point of maximum radial displacement from the center of the screen. Conversely, when the device is close to the transmitting antennas 11, 12, 15 and 16, the gain-control potential applied to units 21, 21a, 21' and 21a' has maximum value and the reduced gain of the latter causes the luminous spot to appear on the screen of tube 23 with minimum radial displacement. Hence, the visual indications are the resultant of two control signals, each of which has a value varying with the product of the distance of the device from antennas 11, 12, 15 and 16 and the relative times of reception of signals from pairs of the antennas. The visual indications therefore have an angular position indicative of direction and a radial position indicative of distance, thereby fully to indicate the position of the indicating device relative to the antennas 11, 12, 15 and 16. The cathode-ray tube screen may thus be calibrated in terms of direction and distance.

In order to aid the navigation of a mobile craft over a considerable distance, a plurality of ground stations, each comprising elements similar to elements 11–18, inclusive, may be provided. All of the wave signals transmitted by each station in this modified form of indicating system have individual frequencies characteristic of that station. They may, for example, lie within individual bands of the frequency spectrum, thus to enable an operator to distinguish one such ground station from another.

Fig. 3 schematically represents a portion of a modified form of indicating device suitable for use with an indicating system of the type last mentioned. This device includes means for selecting all of the wave signals from any desired station and responsive thereto for indicating in a predetermined indicating area the position of the indicating device relative to that station. This means comprises an adjustable tuning element 46 provided in the direction-signal developing system 20 and an adjustable tuning element 48 in the receiver 27. The transmitter 24 of the indicating device also includes a tuning element 47 by which to tune the transmitter to the frequency of the receiver at the selected ground station.

The screen of tube 23 has a predetermined area thereof within which the indications are displayed. Superimposed over the indicating area of the screen of tube 23 is a translucent map 49. This map is scaled in accordance with the distance indication scale of tube 23 and is representative of at least a portion of the geographic area around the selected one of the ground stations, the position of the selected station on the map being centered on the indicating area of the tube. Map 49 is one of a plurality of such maps each adapted to be so positioned and oriented with relation to the indicating area of tube 23 that the luminous spot of the latter indicates the geographic position of the indicating device relative to the antennas of a corresponding selected ground station. For this purpose, the maps are preferably printed or otherwise positioned in consecutive order on a continuous web member 50 which is wound on rollers 52, 53 journalled in a frame 51. The roller 53 is spring-biased to maintain the web member 50 taut between the rollers.

The indicating device also includes means for causing the signal-selecting means 46 of unit 20 to select wave signals characteristic of a desired ground station and for simultaneously moving the appropriate map representative of the station into oriented position with respect to the screen of tube 23. This means comprises a multicontact switch 54 having a contact arm connected through the secondary 55 of a power-supply transformer 56 to the junction of quadrature-related field windings 58a, 58b of a reversible motor 57. The uncommon terminals of windings 58a and 58b are shunted by a condenser C and are connected to individual ones of a pair of arcuate conductive segments 59, 60 which are supported on an insulating wheel structure of a rotatable commutator 61, the segments 59, 60 being separated by insulating segments. A plurality of brushes 62, extending over an arc of the commutator not exceeding 180 degrees and conductively engaging the segments thereof, are individually connected to individual ones of a plurality of contact points of switch 54. The tuning elements 46, 47 and 48 of the respective units 20, 24 and 27 are mechanically connected for uni-control operation with each other and with the commutator 61, as indicated by the broken line 66. The roller 52 of the map transporting arrangement is suitably driven from the motor 57, as indicated by the broken line 64. A pinion gear 63, secured to roller 52 for rotation therewith, engages a gear 65 which is mechanically coupled to the shaft of commutator 61, as indicated by the broken line 66.

Considering now the operation of the system just described, assume initially that the switch 54 has at some previous time been moved to close its left-hand contact as indicated in Fig. 3. It will be seen that the brush 62 which is connected to this switch contact rests upon an insulating segment of the commutator 61, thus interrupting the energizing circuit of the motor 57. The latter consequently is at rest, the tuning elements 46, 47 and 48 of the respective units 20, 24 and 27 are tuned for operation with a selected ground station, and the map 49 is properly oriented over the indicating area of the tube 23 to provide geographical indications of the position of the indicating device relative to the ground station.

Assume now that the mobile craft has progressed to a point at or near the boundary of the area represented by the map 49 and that another ground station must be selected. The switch arm of switch 54 is moved to the contact representative of that station. Assume that it is the contact next to the closed contact illustrated in Fig. 3. The field winding 58b of motor 57 is now directly energized through segment 60 of commutator 61, the field winding 58a is energized through the condenser C thus to produce a field in quadrature with that of the winding 58b, and the rotor of motor 57 begins to rotate. This motion is transmitted to the roller 52 and gear 63, thus causing roller 52 to move in a direction as necessary to position the desired successive map over the indicating area of tube 23. The spring-biased roller 53 maintains the web member 50 under tension during this movement. This motion of the roller 52 is transmitted through the gears 63 and 65 to the commutator 61 and also to the tuning elements 46, 47 and 48 of the respective units 20, 24 and 27 to tune the indicating device to the frequencies characteristic of the desired station simultaneously with the map orientation. This operation continues until the rotary movement of commutator 61 brings the energized brush of the selected switch contact into engagement with an insulating segment of the commutator 61, whereupon the field circuit of motor 57 is interrupted and the motion stops. The preselected position of the brush associated with the closed contact of switch 54 is such, however, that this interruption of the drive motion does not occur until the newly selected map is properly oriented with relation to tube 23 and the units 20, 24 and 27 are properly tuned for operation with the newly selected station. The system thereafter operates to provide indications of geographic position of the indicating device with respect to the newly selected station.

The position-indicating system has been described as including a plurality of transmitting systems 13, 17, a plurality of receivers 14, 18 and associated antenna systems 11, 12, 15 and 16 normally comprising a terrestrially located system operating in conjunction with the position-indicating device comprised by the elements coupled to antennas 19, 25 and 29 normally carried by a craft the position of which is to be indicated. It is explained in the aforementioned copending application that the direction-signal developing system 20 essentially comprises two pairs of receiving systems and that each such pair of systems is responsive to the modulation components of wave signals received from an individual pair of the ground transmitting antennas. It will thus be apparent, from the above description of the invention, that an equally practicable form of position-indicating system embodying the invention is one modified as follows: first, the spaced antennas 11, 12, 15 and 16, terrestrially located, are coupled to individual input circuits of the receiving systems of unit 20, the latter being also terrestrially located; and, secondly, a transpondor system comprising a single receiver 14, a single transmitter of unit 13, and a single antenna associated with these units is carried by the craft the position of which is to be indicated. Indications of the position of the craft are provided in this modified form of the invention at the ground installation.

While an additionally modified form of this system is one in which the single transmitter and receiver last mentioned are terrestrially located and the four spaced antennas and the receiving system are carried by the craft, thus to provide a "homing" type of indicating system, the area available on the craft for the spacing of the spaced antennas usually will be more limited than is desirable for accuracy of indication.

Fig. 4 is a circuit diagram of a portion of an indicating device embodying the present invention in a modified form. The instant arrangement is essentially similar to that of Fig. 1 and similar circuit elements are designated by similar reference numerals. In Fig. 4, the detailed circuit arrangement of the sampling tube, which is representative of the circuit arrangement of the sampling tubes 22a, 22' and 22a' of Fig. 1, is identical to that shown in the aforementioned copending application, except that the screen electrode 67 of the vacuum tube 68 is not fixedly biased to a positive potential as shown in the application. Rather, it is selectively coupled upon closure of a switch 69 to its contact 70 through the filter 43, 44 to the diode rectifier 42 which, in the present arrangement, has reversed polarity to that shown in Fig. 1 and is coupled directly to the output circuit of the amplifier 35, thus dispensing with the amplifier 37 of Fig. 1. The present arrangement requires an additional change from that of Fig. 1 in that the wave form of the saw-tooth signal generated by the generator 26 should be reversed, as shown by curve H of Fig. 5. The operation of the present arrangement with the switch 69 closed to its contact 70 is essentially the same as that of Fig. 1, the periodic-pulse signal developed in the output circuit of the vacuum tube 28 being amplified by the vacuum tube 35 and applied as positive-polarity pulses to the rectifier 42. The latter peak-rectifies these pulses to derive across its load resistor 40 a positive unidirectional potential, the magnitude of which varies with the distance of the indicating device from the antennas 11, 12, 15 and 16 of the ground station. In this connection, it may be noted from Fig. 5 that the amplitude of this derived unidirectional potential is largest when the indicating device is positioned at the remote end of its operating range. This unidirectional potential is applied to the screen electrode 67 of the vacuum tube 68 effectively to control the gain of the sampling tube 22, whereby the indications provided by the cathode-ray tube 23 are indicative both of the direction and distance of the indicating device from the ground station. This operation may be contrasted with that of the Fig. 1 system where the gain-controlled amplifiers 21, 21a, 21' and 21a' perform essentially the same function as does the screen electrode 67 of the vacuum tube 68 in the present arrangement. An indicating device embodying the present arrangement may thus, if desired, dispense with the last-mentioned amplifiers, or if the latter are used, they are of the constant-gain type. The operation of an indicating device embodying the present arrangement is otherwise essentially similar to that of Fig. 1 and will not be repeated.

An even more simplified form of the present invention, which dispenses with the need of the receiver 27 and the tubes 28, 35, 37 and 42 of Fig. 1, is provided by closure of the switch 69 to its switch contact 71 selectively to couple the output circuit of the saw-tooth generator 26 to the screen electrode 67 of the sampling tube 68. It will be recalled from the described operation of the Fig. 1 system that the saw-tooth signal, having the wave form of Fig. 5, generated by the generator 26 is initiated upon the radiation of an interrogating pulse by the transmitter 24. This saw-tooth signal, when applied to the screen electrode 67 of tube 68, is effectively sampled by the reply pulse received by the receiver 20b and applied to the first control electrode 72 of the sampling tube 68. The sampling of the saw-tooth signal of generator 26 by the sampling tube 68 in this manner is effective to develop in the latter a control effect, effective over the magnitude of space current of tube 68 and thus over the value of its amplification, which varies with the distance between the antennas 19 and 25 and the antenna system 11, 12, 15 and 16. The saw-tooth signal applied to the control electrode 73 of tube 68 from the saw-tooth signal generator 20c is also sampled by the reply pulse applied to the control electrode 72 from the receiver 20b, thus to develop in tube 68 a second control effect, which also is effective to control the space current and amplification of tube 68, varying with the direction of the antenna 19 from the antenna system 11, 12, 15 and 16. The signal developed in the output circuit of vacuum tube 68 consequently has a magnitude varying with the direction of the receiving antenna from the transmitting antenna system 11, 12, 15 and 16 and also varying with the distance between the relatively closely spaced antennas 19, 25 and the antenna system 11, 12, 15 and 16. This control signal is applied to the cathode-ray tube 23 of Fig. 1, together with similar signals developed by the sampling tubes 22a, 22' and 22a', to provide an indication in plan view of the position of the antenna system 19, 25 relative to the antenna system 11, 12, 15 and 16. The simplification of the position-indicating system effected by the last-described modification will be at once apparent.

In the arrangements of Figs. 1 and 4, the distance-indicative control potential developed by the rectifier 42 is used to control the sensitivity or gain of the direction indicative signal-translating channels, one of which is comprised by units 20a, 20c, 21 and 22. It will be apparent, however, that the output of the rectifier 42 may be used in a number of ways, as by control of one or more energizing potentials of the cathode-ray tube 23, by which to vary the radial deflection of the electron beam of tube 23 in accordance with the distance of the indicating device from the ground station. A control of the "sensitivity," as this term is used in the appended claims, of the means for providing the direction indication per se in accordance with a control effect varying with the distance of the indicating device from the ground station is thus intended broadly to mean any similar or equivalent control of the direction indicative means to effect this result.

From the above description of the invention, it will be apparent that the position-indicating system is of the radiant-energy type which effects translation of a modulation signal over at least two space paths extending between an antenna of one antenna system and individual spaced antennas of another antenna system. Further, it will be apparent that the position-indicating device is responsive to the modulation signals translated over these space paths for indicating the direction of one of the antenna systems relative to the other and is responsive to modulation signals received from such other antenna system for providing an indication of the distance between the antenna systems, thus to indicate the position of the one antenna system relative to the other.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radiant-energy system of the type which effects the transmission of modulation signals to an antenna of one antenna system from individual ones of at least two spaced antennas of another antenna system and over at least two space paths extending between the antennas of said one and said other antenna systems, a position-indicating device at said one antenna system for indicating the position of said one antenna system relative to said other antenna system comprising, means responsive to modulation signals transmitted from said other antenna system to said one antenna system over said space paths for developing therein a control effect varying with the direction of said one antenna system relative to said other antenna system, means responsive to the transmission of modulation signals from said other antenna system to said one antenna system over one of said space paths for developing therein a control effect varying with the distance between said antenna systems, and means responsive to the joint operation of said first-mentioned and said second-mentioned means for providing in two coordinate directions an indication in plan view of the position of said one antenna system relative to said other antenna system.

2. In a radiant-energy system of the type which effects the transmission of modulation signals to an antenna of one antenna system from individual ones of at least two spaced antennas of another antenna system and over at least two space paths extending between the antennas of said one and said other antenna systems, a position-indicating device at said one antenna system for indicating the position of said one antenna system relative to said other antenna system comprising, means responsive to a modulation signal transmitted from said other antenna system to said one antenna system over one of said space paths for developing a first reference signal and for combining said reference signal with a modulation signal transmitted over another of said space paths to develop in said means a control effect varying with the direction of said one antenna system relative to said other antenna system, means for providing a second reference signal and for combining said second reference signal with a modulation signal transmitted over one of said space paths to develop in said last-named means a control effect varying with the distance between said antenna systems, and means responsive to the joint operation of said first-mentioned and said second-mentioned means for providing in two coordinate directions an indication in plan view of the position of said one antenna system relative to said other antenna system.

3. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for indicating the direction of one of said antenna systems relative to the other, means responsive to modulation signals received from said other antenna system for providing a control effect having a characteristic which varies with the distance of said one antenna system from said other antenna system, and means responsive to said characteristic of said control effect for controlling said first-mentioned means to cause said indications additionally to be indicative of said distance, thereby to indicate the position of said one antenna system relative to said other antenna system.

4. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for indicating the direction of one of said antenna systems relative to the other, means responsive to modulation signals received from said other antenna system for providing a control effect having a characteristic which varies with the distance of said one antenna system from said other antenna system, and means included in said first-mentioned means and responsive to said characteristic of said control effect for controlling the sensitivity of said first-mentioned means to cause said indications additionally to be indicative of said distance, thereby to indicate the position of said one antenna system relative to said other antenna system.

5. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for indicating the direction of one of said antenna systems relative to the other, means responsive to modulation signals received from said other antenna system for providing a control effect having a characteristic which varies with the distance of said one antenna system from said other antenna system, and means included in said first-mentioned means and responsive to said characteristic of said control effect for controlling the over-all gain of said first-mentioned means to cause said indications additionally to be indicative of said distance, thereby to indicate the position of said one antenna system relative to said other antenna system.

6. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for indicating the direction of one of said antenna systems relative to the other, means responsive to modulation signals received from said other antenna system for providing a control effect having a characteristic which varies with the distance of said one antenna system from said other antenna system, and signal-translating means included in at least one signal-translating channel of said first-mentioned means and responsive to said characteristic of said control effect for controlling said first-mentioned means to cause said indications additionally to be indicative of said distance, thereby to indicate the position of said one antenna system relative to said other antenna system.

7. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for indicating the direction of one of said antenna systems relative to the other, means responsive to modulation signals received from said other antenna system for providing a gain-control signal having an amplitude which varies with the distance of said one antenna system from said other antenna system, and gain-controllable means included in said first-mentioned means and responsive to said gain-control signal for controlling said first-mentioned means to cause said indications additionally to be indicative of said distance, thereby to indicate the position of said one antenna system relative to said other antenna system.

8. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for developing at least one signal indicative of direction, means responsive to said developed signal for indicating the direction of one of said antenna systems relative to the other, means responsive to modulation signals received from said other antenna system for providing a control effect having a characteristic which varies with the distance of said one antenna system from said other antenna system, and means responsive to said characteristic of said control effect for controlling a characteristic of said direction-indicative signal to cause said indications additionally to be indicative of said distance, thereby to indicate the position of said one antenna system relative to said other antenna system.

9. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for developing at least one signal indicative of direction, means responsive to said developed signal for indicating the direction of one of said antenna systems relative to the other, means responsive to modulation signals received from said other antenna system for providing a control effect having a characteristic which varies with the distance of said one antenna system from said other antenna system, and means responsive to said characteristic of said control effect for controlling the amplitude of said direction-indicative signal to cause said indications additionally to be indicative of said distance, thereby to indicate the position of said one antenna system relative to said other antenna system.

10. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for developing at least one direction-indicative signal having a value varying with the relative lengths of said space paths, means responsive to said developed signal for producing a visual indication having a characteristic indicative of the direction of one of said antenna systems relative to the other, means responsive to modulation signals received from said other antenna system for providing a control effect having a characteristic which varies with the distance of said one antenna system from said other antenna system, and means responsive to said characteristic of said control effect for controlling said first-mentioned means to cause said visual indication additionally to have a characteristic indicative of said distance, thereby to indicate the position of said one antenna system relative to said other antenna system.

11. In a radiant-energy system of the type which effects translation of a modulation signal over at least two space paths extending between an antenna of one antenna system and individual spaced antennas of another antenna system, a position-indicating device for indicating the position of one of said antenna systems relative to the other comprising, means responsive to modulation signals translated over said space paths for providing a visual indication having an angular position indicative of the direction of one of said antenna systems relative to the other, means responsive to modulation signals received from said other antenna system for providing a control effect having a characteristic which varies with the distance of said one antenna system from said other antenna system, and means responsive to said characteristic of said control effect for controlling said first-mentioned means to cause said visual indication to have a radial position indicative of said distance, thereby to indicate the position of said one antenna system relative to said other antenna system.

12. A position-indicating system comprising, a pair of antenna systems including at least three spaced antennas two of which are relatively closely spaced, transpondor means coupled to one of said antenna systems for effecting the translation of a modulation signal over at least two space paths extending between individual ones of the two closely spaced antennas and the third antenna of said antenna systems, means coupled to the other of said antenna systems for transmitting an interrogating signal to cause said transpondor means to effect the translation of said modulation signal over said space paths, means responsive to modulation signals translated over said space paths for indicating the direction of one of said antenna systems relative to the other, means having an operation initiated by the interrogating signal of said transmitting means and responsive to modulation signals received from said transpondor means for providing a control effect having a characteristic which varies with the distance between said antenna systems, and means responsive to said characteristic of said control effect for controlling said first-mentioned signal-responsive means to cause said indications additionally to be indicative of said distance, thereby to indicate the position of said one antenna system relative to said other antenna system.

13. In a radiant-energy system of the type which effects translation of a modulation signal over a plurality of space paths extending between at least one antenna of a first antenna system and individual ones of at least three spaced antennas of a second antenna system, a position-indicating device for indicating the position of one of said antenna systems relative to the other comprising, means responsive to modulation signals translated over pairs of said space paths for developing at least one pair of direction-indicative signals, means responsive to said developed signals for indicating the direction of one of said antenna systems relative to the other, means responsive to modulation signals received from said other antenna system for providing a control effect having a characteristic which varies with the distance between said antenna systems, and means responsive to said characteristic of said control effect for controlling a characteristic of each of said direction-indicative signals to cause said indications additionally to be indicative of said distance, thereby to indicate the position of said one antenna system relative to said other antenna system.

14. In a radiant-energy system of the type which effects translation of a modulation signal over a plurality of space paths extending between at least one antenna of a first antenna system and individual ones of at least three spaced antennas of a second antenna system, a position-indicating device for indicating the position of one of said antenna systems relative to the other comprising, means responsive to modulation signals translated over pairs of said space paths for developing at least one pair of direction indicative signals, means responsive to said developed signals for indicating the direction of one of said antenna systems relative to the other, means responsive to modulation signals received from said other antenna system for providing a control effect having a characteristic which varies with the distance between said antenna systems, and means responsive to said characteristic of said control effect for varying the amplitude of each of said direction indicative signals to cause said indications additionally to be indicative of said distance, thereby to indicate the position of said one antenna system relative to said other antenna system.

15. In a radiant-energy system of the type which effects translation of a modulation signal over a plurality of space paths extending between at least one antenna of a first antenna system and individual ones of at least three spaced antennas of a second antenna system, a position-indicating device for indicating the position of one of said antenna systems relative to the other comprising, means responsive to modulation signals translated over one pair of said space paths for developing a first direction-indicative signal having a value varying with the relative lengths of said one pair of space paths, means responsive to modulation signals translated over another pair of said space paths for developing a second direction-indicative signal having a value varying with the relative lengths of said other pair of space paths, means responsive to said developed signals for indicating the direction of one of said antenna systems relative to the other, means responsive to modulation signals received from said other antenna system for providing a control effect having a characteristic which varies with the distance between said antenna systems, and means responsive to said characteristic of said control effect for controlling a characteristic of each of said direction-indicative signals to cause said indications additionally to be indicative of said distance, thereby to indicate the position of said one antenna system relative to said other antenna system.

16. In a radiant-energy system of the type which effects translation of a modulation signal over a plurality of space paths extending between at least one antenna of a first antenna system and individual ones of at least three spaced antennas of a second antenna system, a position-indicating device for indicating the position of one of said antenna systems relative to the other comprising, means responsive to modulation signals translated over pairs of said space paths for developing at least one pair of direction-indicative signals, means responsive to said developed signals for producing a resultant visual indication having an angular position indicative of the direction of one of said antenna systems relative to the other, means responsive to modulation signals received from said other antenna system for providing a control effect having a characteristic which varies with the distance between said antenna systems, and means responsive to said characteristic of said control effect for controlling said first-mentioned means to cause said visual indications to have a radial position indicative of said distance, thereby to indicate the position of said one antenna system relative to said other antenna system.

17. In a position-indicating system including a plurality of stations each comprising at least one transmitter and at least two spaced antennas for transmitting individual ones of a plurality of wave signals characteristic of said each station, a position-indicating device for receiving signals from any selected one of said stations to indicate its position with respect to the selected station comprising, means for selecting the wave signals characteristic of a selected one of said stations and responsive thereto for indicating in a predetermined indicating area the direction of said position-indicating device relative to said selected station, means for selecting one of said wave signals from said selected station and responsive thereto for providing a control effect having a characteristic which varies with the distance of said indicating device from said selected station, means responsive to said characteristic of said control effect for controlling said first-mentioned means to cause said indications additionally to be indicative of said distance, a plurality of maps each representative of at least a portion of the geographical area around an individual one of said stations and adapted to be so positioned and oriented with relation to said indicating area that said indications indicate the geographical position of said indicating device relative to a selected station, and means for causing said first-mentioned means to select wave signals characteristic of said selected one of said stations and for simultaneously moving the one of said maps corresponding to said one station into said oriented position.

18. In a position-indicating system of the type including at least one transmitter and at least two spaced antennas for transmitting individual ones of a plurality of wave signals, a position-indicating device for receiving said signals to indicate its position with respect to said antennas comprising, means for selectively receiving all of said wave signals and responsive thereto for indicating in a predetermined indicating area the direction of said position-indicating device relative to said antennas, means for selecting one of said wave signals and responsive thereto for providing a control effect having a characteristic which varies with the distance of said indicating device from that one of said antennas emitting said one of said wave signals, means responsive to said characteristic of said control effect for controlling said first-mentioned means to cause said indications additionally to be indicative of said distance, a map scaled to said distance indications and adapted to be so positioned and oriented with relation to said indicating area that said indications indicate the geographic position of said indicating device relative to said antennas, and means for causing said first-mentioned means to select said wave signals and for simultaneously moving said map into said oriented position.

19. In a position-indicating system of the type including at least one transmitter and at least three antennas spaced in nonlinear relationship for transmitting individual ones of a plurality of wave signals, a position-indicating device for receiving said signals to indicate its position with respect to said antennas comprising, means responsive to signals received from a first two of said antennas for developing a first control signal having a value varying with the product of the relative times of reception of signals from said first two antennas and the distance of said indicating device from one of said first-mentioned antennas, means responsive to signals received from a second two of said antennas in a different line than said first two antennas for developing a second control signal having a value varying with the product of the relative times of reception of signals from said second two antennas and said distance, and signal-display means including means responsive to said first control signal for effecting the indication of said display means in one coordinate direction and responsive to said second control signal for effecting the indications of said display means in another coordinate direction, thereby to indicate the position of said indicating device relative to said antennas.

ARTHUR V. LOUGHREN.

REFERENCES CITED

The following references are of record in the file of this patent:

UNITED STATES PATENTS

| Number | Name | Date |
| --- | --- | --- |
| 2,248,215 | Budenbom | July 8, 1941 |
| 2,267,715 | Bowen | Dec. 30, 1941 |
| 1,922,677 | Greig et al. | Aug. 15, 1933 |

FOREIGN PATENTS

| Number | Country | Date |
| --- | --- | --- |
| 542,634 | Great Britain | Jan. 21, 1942 |